June 15, 1937. E. C. WEISGERBER 2,083,764
SCRUBBER
Filed Nov. 13, 1935
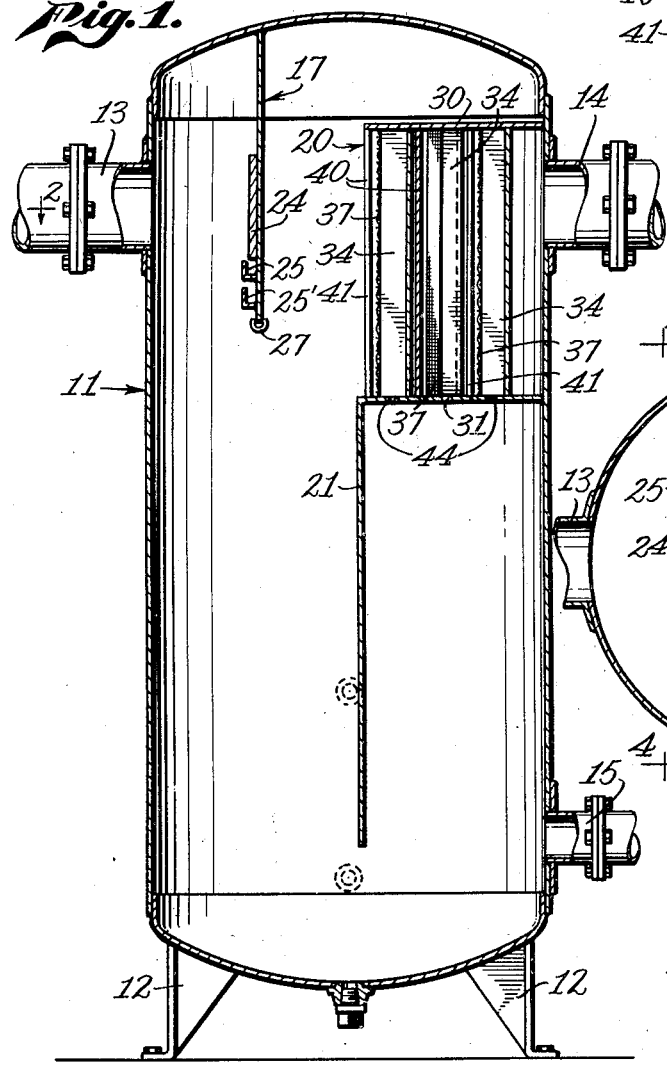
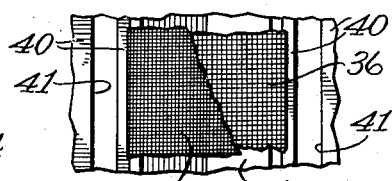
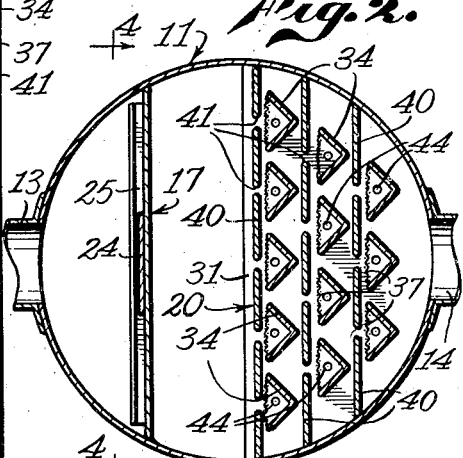
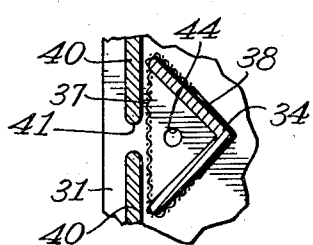
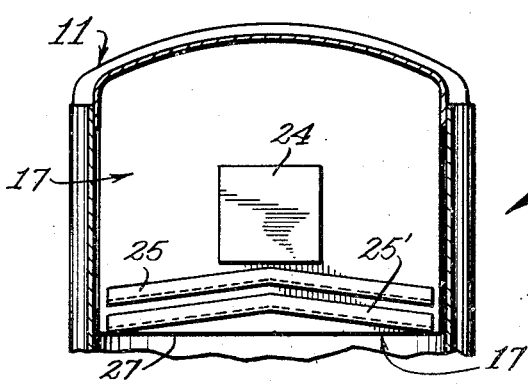

Patented June 15, 1937

2,083,764

UNITED STATES PATENT OFFICE 2,083,764

SCRUBBER

Edwin C. Weisgerber, Los Angeles, Calif., assignor to Master Separator and Valve Company, a corporation of California Application November 13, 1935, Serial No. 49,462

15 Claims. (Cl. 183—110)

This invention relates to the art of separating entrained liquids and solids from a gas or vapor medium and has as its primary object the production of improvements in gas and vapor scrubbers wherein the physical principles of linear deflection, contraction and expansion, jetting, capillary attraction, and wiping of fluid are employed in novel combination to insure a thoroughly scrubbed product with a minimum back pressure.

It is a further object of this invention to produce a scrubber of the class described having a scrubbing unit in which the fluid is passed through a series of screen sections which act to collect the entrained liquid in droplets in a manner such that the droplets unite to form drops of appreciable size which flow down these screen elements to a point at which they are recovered as a liquid body. In this connection my invention contemplates the preferred use of a double screen in such screen sections, this double screen comprising first a screen of fine mesh through which the liquid passes initially and then a coarse mesh which serves to accumulate the minute droplets collected on the fine screen so that they become of sufficient size to flow downwardly into the collecting unit.

It is a further noteworthy feature of this invention that the gaseous or vapor medium is passed through the screen elements in the nature of a jet or jets and in this preferred form of my invention the jetting action is attained by employing a vertical partition member for each bank of screen sections in the scrubbing unit such partition member being provided with a slot positioned opposite each screen section in the adjacent bank.

A still further feature of this invention resides in the fact that the screen sections are used twice so far as the passage of fluid medium is concerned since my invention contemplates the use of deflecting units positioned behind the screen sections to redirect the gaseous medium back through a portion of each screen section in spaced relation with the region at which the gaseous medium entered. My invention is adapted for use in connection with various mediums, the efficiency and utility on a particular medium being governed to a certain degree by the number of banks or the number of screen sections employed.

Since the fluid medium which is to be scrubbed may carry water or other liquid in suspension, my invention contemplates first passing such medium into engagement with a deflecting plate where it is subjected to linear deflection. This deflecting plate is provided with trough means provided to receive the liquid released on the splash or deflecting plate, such trough means being arranged to conduct the liquid away from the path of the stream of gas. Furthermore the deflecting plate is arranged so that the gaseous medium is spread out in a fan shape, the plate acting as a weir so that maximum efficiency of the scrubbing unit is obtained.

The details in the construction of a preferred embodiment of my invention, together with other objects attending its production will be best understood from the following description of the accompanying drawing which is chosen for illustrative purposes only and in which Fig. 1 is a sectional elevation showing one preferred embodiment of my invention;

Fig. 2 is a plan section taken along the line 2—2 of Fig. 1;

Fig. 3 is an enlarged plan section illustrating one preferred arrangement of screen element with the jetting and deflecting means associated therewith;

Fig. 4 is a fragmentary sectional elevation taken along the line 4—4 of Fig. 2; and Fig. 5 is an enlarged fragmentary front elevation with parts broken away illustrating the preferred construction of the screen section and associated parts contemplated by this invention.

More particularly describing the invention as herein illustrated, reference numeral 11 indicates a scrubber shell which is shown as being provided with legs 12. In this form of my invention the scrubber shell is shown as being provided with an inlet connection 13 near its upper end to admit the gaseous or vapor fluid medium with its entrained material and in substantially opposite relation with the inlet connection the shell is shown as being provided with a gas outlet connection 14 through which the scrubbed gas or vapor leaves the shell. The bottom portion of the shell is shown as being provided with a liquid drain connection 15 through which the liquid removed from the gas or vapor medium is discharged.

Mounted in front of the inlet connection 13 is a deflecting plate or splashing plate 17 and in front of the outlet connection 14, I provide a scrubbing unit generally indicated by reference numeral 20. Extending downwardly below the bottom front edge of this scrubbing unit is a partition member 21 which extends substantially to the bottom of the shell and serves the purpose of insuring all of the fluid medium passing into the scrubbing unit 20.

The front of the splash plate or deflecting plate 17 is provided with a wear resisting plate 24 adapted to receive the abrasive action of the fluid and its entrained or suspended material, such plate being positioned directly opposite the inlet opening so as to receive the full impact of the incoming material. Mounted on the plate immediately below this wear receiving plate, I provide one or more trough or channel members indicated at 25 and 25' such channel members being positioned so as to receive any slugs or drops of water which are released on the deflecting plate. It will be observed that these troughs are downwardly inclined from their mid portions so as to conduct such water or other liquid to the edges of the shell where it travels downwardly along the shell wall so that it is not subjected to the possibility of being picked up again by the flowing gaseous or vapor medium. The bottom edge of the deflecting plate 17 is provided with a rounded surface as indicated at 27 such surface being employed for the purpose of giving the maximum weir effect to the fluid medium as it travels downwardly thereunder into the shell. In other words this deflecting plate with its rounded edge serves to spread the fluid medium into a fan shape which instead of traveling downwardly a substantial distance into the tank, moves on toward the scrubbing unit 20.

The scrubbing unit 20 is shown as comprising a top plate 30 and a bottom plate 31 which are positioned above and below the outlet opening 14. These plates are shown as being positioned a substantial distance apart and in this form of my invention the bottom plate 31 is shown as being in a plane below the plane of the lower edge 27 of the deflecting plate 17.

The scrubbing unit may be broadly described as comprising a plurality of banks of screen sections, each section having a slotted member in front of it to afford a jetting action in the stream of fluid medium and each section also having deflecting means behind it which acts as a wiping surface for the gas or vapor medium and which removes some of the entrained liquid and also directs the gas or vapor back through regions of the screen section in spaced relation with its region of entry.

The screen sections, the slots and the deflecting means are arranged so that the fluid medium passes successively through the different banks of screen sections before it is admitted to the outlet opening 14. As has been pointed out above the number of banks of screen sections and the number of screen sections in each bank may be varied depending upon the fluid medium and the extent to which it is saturated with liquid.

In this particular embodiment of my invention I form the screen sections, together with their associated jetting and deflecting means above referred to, by employing a plurality of vertical angle members generally indicated by reference numeral 34. These angle members are mounted between plates 30 and 31 with their open faces positioned away from the outlet opening 14. In other words the apexes of these angle members face the outlet opening 14. As is clearly illustrated in Fig. 2, the angle members are arranged in rows to provide banks, three of such banks being shown in this form of my invention.

Mounted on the open face of each of these angle members is a screen section which, for the reasons which will be hereinafter pointed out, are preferably comprised of two screens. This construction is best illustrated in Fig. 5 wherein each section is shown as comprising a coarse screen 36 mounted on the edges of the angle member and a fine screen 37 which is mounted over the coarse screen with its edges pulled rearwardly around the angle member and secured thereto in any suitable manner such as by means of binding straps 38.

Mounted in front of each bank of angle members 34 I provide a partition member 40 which extends between the two plates 30 and 31 and the two sides of the shell. Each of the partition plates 40 is provided with a plurality of vertical slots 41 corresponding in number to the number of angle members in the adjacent bank. Each slot is of substantially less width than the width of the open face in the corresponding angle member and is preferably positioned opposite the center line of the screen sections, or, as in this form of my invention opposite the apex of the associated angle member. In order to reduce the eddying and abrasive action of the fluid as it passes through the slots, I prefer to form them by means of a cutting torch whereby the vertical edges thereof are rounded.

These slots are effective to form elongated jets or ribbons in the gaseous medium passing therethrough, the jets being directed through the screens and into the angle members where they are reversed and wiped rearwardly along the edges of the angle members and back through the screen. In the bottom plate 31 directly below each angle member 34, I provide a drain opening 44 through which the liquid released in the angle member and on the screens travels downwardly into the bottom portion of the shell 11.

In operation the steam or other gas or vapor medium enters the shell 11 through the opening 13 under a substantial pressure differential with respect to the outlet opening 14 and impinges upon the deflecting plate 17 where any slugs, or drops of water, or other liquid present, are released and received in the troughs 25 and 25' to be conducted away from the path of the vapor in the manner pointed out above. The gaseous medium travels downwardly along the deflecting plate, fanning outwardly and upwardly over the rounded edge 27 after which it passes through the first slots 41 in the partition member 40. These slots 41 set up a jetting action in the fluid which passes therethrough in long narrow ribbons such action being attended first by contraction and then expansion, the expansion taking place through the screens of the associated screen sections and angle members generally indicated at 34. As has been indicated above these ribbon like jets of fluid pass through the slots toward the center of the respective screens, the gas passing on through the screens, to strike against the back or apex of the angle member after which it turns and is again passed through the screen in spaced relation with its point of entry. Under glass it has been found by me that this steam or other vapor medium largely confines itself around the sides of the angle irons or angles so that a wiping action is obtained here which is attended by a further deposition of entrained liquid. The minute droplets of liquid, such as water, oil, etc. which is carried in the gaseous medium as it passes through the screen adheres to the fine screens, about $\frac{3}{5}$ths of the droplet being on the inside of the fine screen and $\frac{2}{5}$ths on the outside. Inasmuch as the pressure is always from the outside of the screen toward the inside, this forces these droplets against the coarse screen and here adhesion takes place between the small droplets where two or more of them contact each other to form a drop of sufficient size to run down the coarse screen and out through the openings in the bottom plate 31. The principle of capillary attraction is enacted inside of the angle and the coarse screen so that the screens are kept clean at all times. After the fluid medium has passed from the first set or bank of angles and screens it is forced to travel around the outside of the angles in this bank and pass through the slot in the next partition member where it is again contracted and then expanded after which it passes through the next set of screen sections into that bank of angle members where it is deflected and brought out and passed through the next bank. As has been pointed out hereinabove the number of banks and the number of sections in each bank may be varied depending upon the particular use to which the scrubbing element is to be subjected.

It will be apparent from the foregoing description that I have developed a scrubber which has very great efficiency and from which a thoroughly dried and scrubbed vapor or gaseous medium may be removed with a minimum of back pressure upon the entering or inlet system.

It is to be understood that while I have herein described and illustrated one preferred form of my invention, that the invention is not limited to the precise construction described above but includes within its scope whatever changes fairly come within the spirit of the appended claims.

I claim as my invention:

1. A separator of the class described embodying: a shell having a fluid inlet opening and a gas outlet opening; a deflecting plate mounted in said shell opposite said inlet opening; a separating chamber in said shell opposite said outlet opening; a plurality of upright screen sections in said separating chamber; means for jetting fluid through the mid portion of said screen sections to separate entrained liquid therefrom; and angular deflecting means behind said screen sections for directing said fluid back through the edge portions of said screen sections.

2. A separator of the class described embodying: a shell having a fluid inlet opening and a gas outlet opening; a deflecting plate mounted in said shell opposite said inlet opening; a separating chamber in said shell opposite said outlet opening; a plurality of upright screen sections in said separating chamber; means comprising partition plates having vertical slots aligned with the centers of said screen sections for jetting fluid through the mid portions of said screen sections to separate entrained liquid therefrom; and deflecting means behind said screen sections for directing said fluid back through the edge portions of said screen sections.

3. A separator of the class described embodying: a shell having a fluid inlet opening and a gas outlet opening; a deflecting plate mounted in said shell opposite said inlet opening; a separating chamber in said shell opposite said outlet opening; a plurality of upright screen sections in said separating chamber; means for jetting fluid through the mid portions of said screen sections to separate entrained liquid therefrom; and deflecting means comprising vertical angle members positioned with their edges engaging said screen sections and with their apexes behind the vertical center lines of said screen sections for directing said fluid back through the edge portions of said screen sections.

4. A separator of the class described embodying: a shell having a fluid inlet opening and a gas outlet opening; a deflecting plate mounted in said shell opposite said inlet opening; a separating chamber in said shell opposite said outlet opening; a plurality of upright screen sections in said separating chamber; means for jetting fluid through the mid portions of said screen sections to separate entrained liquid therefrom; and deflecting means comprising upright angle members positioned behind said screen sections with their edges engaging the edges of said screen sections for directing said fluid back through the edge portions of said screen sections.

5. A separator of the class described embodying: a shell having a fluid inlet opening and a gas outlet opening; a deflecting plate mounted in said shell opposite said inlet opening; a separating chamber in said shell opposite said outlet opening; a plurality of upright screen sections in said separating chamber; means for jetting fluid through the mid portions of said screen sections to separate entrained liquid therefrom; and deflecting means comprising upright angle members positioned with their apexes extending outwardly behind said screen sections for directing said fluid back through the edge portions of said screen sections.

6. A separator of the class described embodying: a shell having a fluid inlet opening and a gas outlet opening; a deflecting plate mounted in said shell opposite said inlet opening; a separating chamber in said shell opposite said outlet opening; a plurality of upright screen sections in said separating chamber; means comprising partition plates having upright slots in front of said screen sections for jetting fluid through the mid portions of said screen sections to separate entrained liquid therefrom; and deflecting means comprising upright angle members positioned with their apexes extending behind said screen sections for directing said fluid back through the edge portions of said screen sections.

7. A separator of the class described embodying: a shell having a fluid inlet opening and a gas outlet opening; a deflecting plate mounted in said shell opposite said inlet opening; open topped channel means on said deflecting plate for collecting liquid and conducting same away from the path of the gas in said fluid; a separating chamber in said shell opposite said outlet opening; a plurality of upright screen sections in said separating chamber; means for jetting fluid through the mid portions of said screen sections to separate entrained liquid therefrom; and deflecting means behind said screen sections for directing said fluid back through the edge portions of said screen sections.

8. A separator of the class described embodying: a shell having a fluid inlet opening and a gas outlet opening; a deflecting plate mounted in said shell opposite said inlet opening; trough means on said deflecting plate for collecting liquid from said fluid and conducting same away from the path of the gas in said fluid; a separating chamber in said shell opposite said outlet opening; a plurality of upright screen sections in said separating chamber; means comprising partition plates having upright slots in front of said screen sections for jetting fluid through the mid portion of said screen sections to separate entrained liquid therefrom; and deflecting means comprising upright angle members positioned with their apexes extending behind said screen sections for directing said fluid back through the edge portions of said screen sections.

9. A separator of the class described embodying: a shell having a fluid inlet opening and a gas outlet opening; a deflecting plate mounted in said shell opposite said inlet opening; a separating chamber in said shell opposite said outlet opening; a plurality of upright screen sections in said separating chamber; means for jetting fluid through the mid portions of said screen sections to separate entrained liquid therefrom; and deflecting means behind said screen sections for directing said fluid back through the edge portions of said screen sections, said screen sections comprising a fine screen positioned adjacent said jetting means and a coarse screen engaging the rear surface of said fine screen.

10. A separator of the class described embodying: a shell having a fluid inlet opening and a gas outlet opening; a deflecting plate mounted in said shell opposite said inlet opening; a separating chamber in said shell opposite said outlet opening; a plurality of upright screen sections in said separating chamber; means for jetting fluid through the mid portions of said screen sections to separate entrained liquid therefrom; deflecting means behind said screen sections for directing said fluid back through the edge portions of said screen sections; a partitioning plate extending downwardly from the inner edge of the bottom of said separating chamber and terminating above the bottom of said shell; means in the bottom of said separating chamber for draining liquid separated therein into the region of said shell behind said partitioning plate; and a liquid outlet connection in the bottom portion of said shell.

11. A separator of the class described embodying: a shell having a fluid inlet opening and a gas outlet opening; deflecting means mounted in said shell opposite said inlet opening; a separating chamber in said shell opposite said outlet opening; a plurality of upright screen sections in said separating chamber; means in front of said screen sections for jetting the fluid in said shell through said screen sections; and deflecting means behind said screen sections for directing fluid which has passed said screen sections back through another portion of the screen section through which it has passed.

12. For use in a separator shell of the class described having an inlet and outlet opening, a separating unit embodying; top and bottom plate members positioned in said shell above and below said outlet opening; a plurality of upright angle members mounted between said plate and arranged with their open sides facing away from said outlet opening; screens mounted over the open faces of said angle members; and a partition plate mounted between said top and bottom plate in front of each bank of angle members, each of said partition plates being formed with a plurality of vertical slots each slot being positioned in front of a corresponding angle member in the adjacent bank.

13. For use in a separator shell of the class described having an inlet and outlet opening, a separating unit embodying; top and bottom plate members positioned in said shell above and below said outlet opening; a plurality of upright angle members mounted between said plates and arranged with their open sides facing away from said outlet opening; screens mounted over the open faces of said angle members; and a partition plate mounted between said top and bottom plates in front of each bank of angle members, each of said partition plates being formed with a plurality of vertical slots each slot being positioned in front of a corresponding angle member in the adjacent bank, said slots being of substantially less width than the open face on the corresponding angle member.

14. For use in a separator shell of the class described having an inlet and outlet opening, a separating unit embodying; top and bottom plate members positioned in said shell above and below said outlet opening; a plurality of upright angle members mounted between said plates and arranged with their open sides facing away from said outlet opening; coarse screens mounted over the open faces of said angle members; fine screens mounted on said angle members in engagement with the outer surfaces of said coarse screens; and a partition plate mounted between said top and bottom plates in front of each bank of angle members, each of said partition plates being formed with a plurality of vertical slots each of said slots being positioned in front of a corresponding angle member in the adjacent bank.

15. For use in a separator shell of the class described having an inlet and an outlet opening, a separating unit embodying; top and bottom plate members positioned in said shell above and below said outlet opening; a plurality of upright angle members mounted between said plates and arranged with their open sides facing away from said outlet opening; screens mounted over the open faces of said angle members; and a partition plate mounted between said top and bottom plates in front of each bank of angle members, each of said partition plates being formed with a plurality of vertical slots each of said slots being positioned in front of a corresponding angle member in the adjacent bank, said bottom plate being provided with drain openings situated below said angle members.

EDWIN C. WEISGERBER.